United States Patent [19]
Walz

[11] Patent Number: 5,464,297
[45] Date of Patent: Nov. 7, 1995

[54] FITTING, PARTICULARLY FITTING FOR CONNECTING PLATES

[75] Inventor: Rüdiger Walz, Mötzingen, Germany

[73] Assignee: Häfele GmbH & Co., Nagold, Germany

[21] Appl. No.: 131,724

[22] Filed: Oct. 5, 1993

[30] Foreign Application Priority Data

Oct. 10, 1992 [DE] Germany ............................. 9213729 U

[51] Int. Cl.⁶ ..................................................... F16B 9/00
[52] U.S. Cl. ........................... 403/231; 403/230; 403/297; 403/403; 403/407.1
[58] Field of Search .................................. 403/230, 231, 403/245, 246, 297, 403, 405.1, 406.1, 407.1, 11, 12, 21, 362; 411/104, 354

[56] References Cited

U.S. PATENT DOCUMENTS

| | | | |
|---|---|---|---|
| 4,408,923 | 10/1983 | Kubler | 403/231 X |
| 4,487,522 | 12/1984 | Appleby et al. | 403/231 |
| 4,502,810 | 3/1985 | Nock | 403/231 |
| 4,505,610 | 3/1985 | Röck et al. | 403/231 |
| 4,564,306 | 1/1986 | Rock et al. | 403/231 X |
| 4,756,637 | 7/1988 | Walz | 403/231 |
| 4,826,345 | 5/1989 | Salice | 403/231 |
| 4,957,386 | 9/1990 | Harley et al. | 403/407.1 X |
| 4,984,926 | 1/1991 | Harley | 403/231 X |

FOREIGN PATENT DOCUMENTS

| | | | |
|---|---|---|---|
| 2039659 | 8/1980 | United Kingdom | 403/231 |
| 2074689 | 11/1981 | United Kingdom | 403/403 |

*Primary Examiner*—Randolph A. Reese
*Assistant Examiner*—Andrea Chop
*Attorney, Agent, or Firm*—Friedrich Kueffner

[57] ABSTRACT

A fitting, particularly a fitting for connecting plates, includes a connecting member insertable into a cup-shaped recess. A tightening screw is rotatably mounted in the cup-shaped insert and extends obliquely relative to the direction of insertion of the connecting member into the cup-shaped insert. The tightening screw has a front end which acts on a front inner edge of a recess provided in the connecting member. The tightening screw is mounted with a slight play in the cup-shaped insert. The front edge of the connecting member has an inclined abutting surface for the tightening screw.

7 Claims, 2 Drawing Sheets

FITTING, PARTICULARLY FITTING FOR CONNECTING PLATES

BACKGROUND OF THE INVENTION

1. Field of the Invention

The present invention relates to a fitting, particularly a fitting for connecting plates. The fitting includes a cup-shaped insert and a connecting member insertable in the cup-shaped insert. A tightening screw extending obliquely relative to the direction of insertion of the connecting member is rotatably mounted in the cup-shaped insert. The front end of the tightening screw acts on the forward inner edge of a recess of the connecting member.

2. Description of the Related Art

Fittings of the above-described type are used most frequently in the manufacture of furniture and for constructing the interior of buildings. When plates are mounted together, it is desirable that the structural components are supported relative to each other even before the final assembly because the person assembling the components cannot simultaneously hold the plates and tighten the fittings.

SUMMARY OF THE INVENTION

Therefore, it is the primary object of the present invention to provide a fitting of the above-described type in which a preliminary locking of the fitting parts is possible.

In accordance with the present invention, the tightening screw is mounted in the cup-shaped insert with a slight play and the front edge of the connecting member has an inclined abutting surface for the tightening screw.

Thus, when the tightening screw is screwed in prior to the assembly of the parts to such an extent that the front end of the tightening screw is located slightly underneath the surface of the connecting member, the tightening screw arranged with play is pressed back by the inclined abutting surface of the connecting member when the connecting member is inserted and subsequently the front end of the tightening screw engages in a locking manner behind the front inner edge of the recess of the connecting member, so that a preliminary connection between the plates is created. Subsequently, the tightening screw can be screwed in further, so that the plates are pulled tightly together.

In the known fitting, the front end of the tightening screw has a point, so that only a point contact is obtained between the front end of the screw and the forward inner edge of the recess. Accordingly, to be able to apply greater tightening forces, another feature of the present invention provides that the front end of the tightening screw has a plane surface and the inner edge of the recess of the connecting member interacting with the tightening screw has an inclined surface extending approximately parallel to the plane surface of the tightening screw. This results in a surface contact with all the attendant advantages.

In accordance with another advantageous feature, the tightening screw is supported in a nut arranged in the cup-shaped insert. This configuration prevents excessive turning of the screw within the cup-shaped insert which is usually made of plastic material. In addition, a reproducible screw connection is achieved when the tightening screw is tightened and the application of greater forces is possible. The nut arranged in the cup-shaped insert is preferably a square nut which is arranged in a longitudinal slot provided in the cup-shaped insert and extending perpendicularly to the longitudinal axis of the tightening screw. The square nut is arranged in the longitudinal slot so as to be slidable, but secured against rotation. The slidable arrangement of the nut makes it possible to provide the play necessary for locking.

In accordance with another advantageous feature of the present invention, the connecting member has a stop which is preferably mounted in a recess of the cup-shaped insert. This makes it possible to place the plates flush next to each other. The stop preferably is a lug bent perpendicularly out of the plane of the connecting member.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there is illustrated and described a preferred embodiment of the invention.

DETAILED DESCRIPTION OF THE PREFERRED EMBODIMENTS

Figure 1:
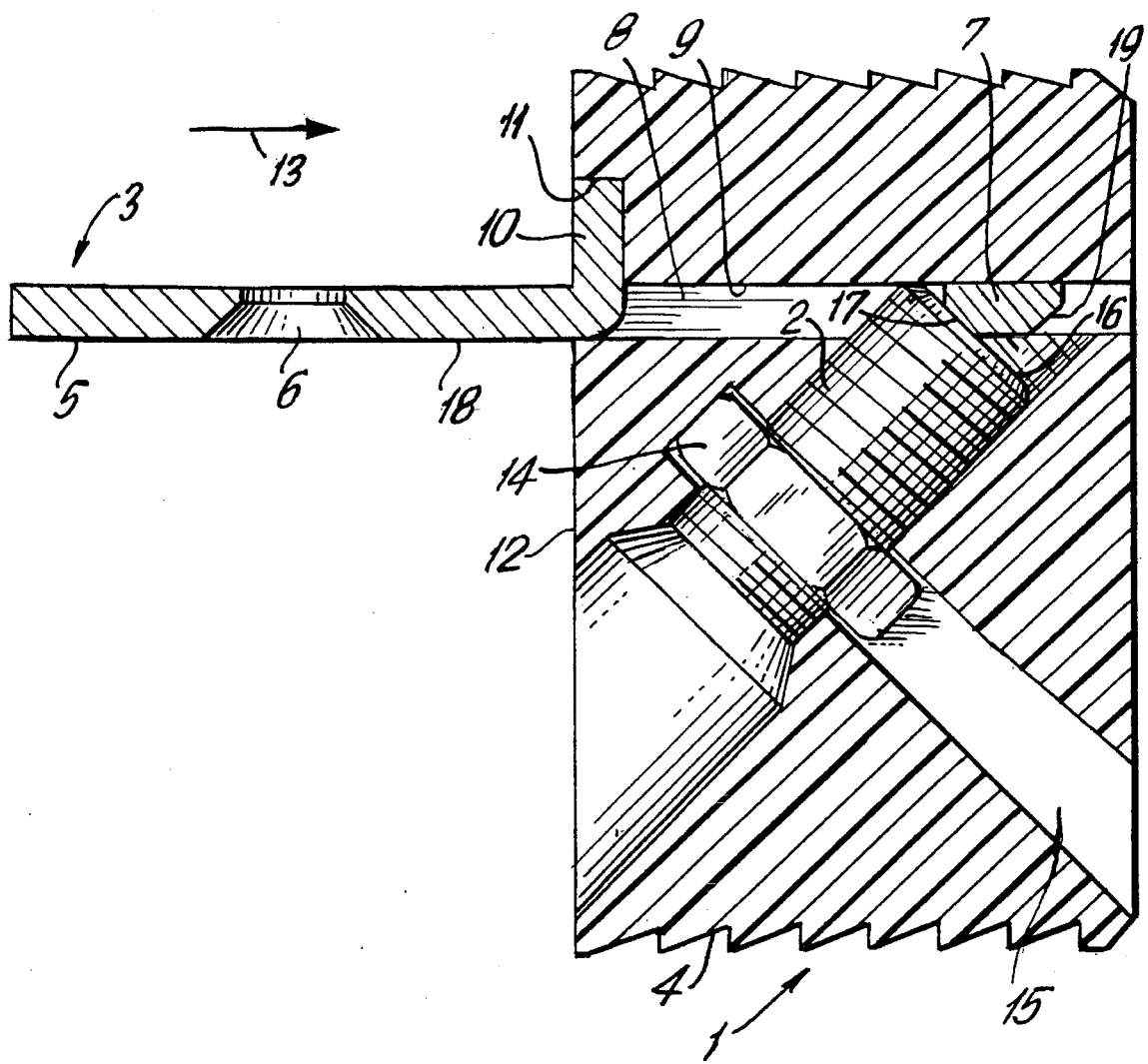
FIG. 1 is cross-sectional view of the fitting according to the present invention.
Figure 2:
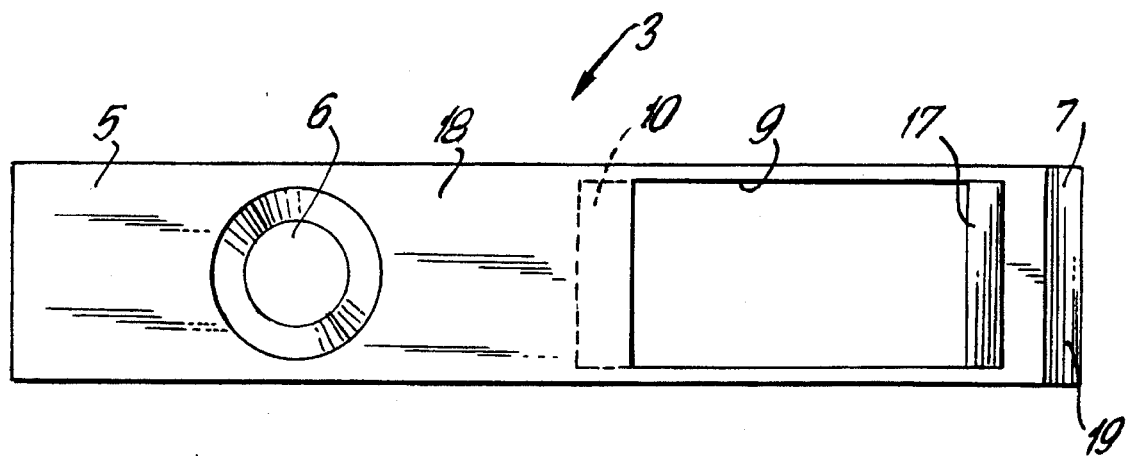
FIG. 2 is a top elevational view of the connecting member of the fitting of FIG. 1.

As illustrated in FIG. 1 of the drawing, the fitting according to the present invention includes a cup-shaped insert 1, a tightening screw 2 and a connecting member 3. The cup-shaped insert 1 is provided at its outer periphery with barb-like grooves 4 which serve to secure the cup-shaped insert 1 after it has been inserted into a bore hole of a plate, not shown. The connecting member 3 is provided at its rearward end 5 with a bore 6, so that the connecting member 3 can be screwed together with another plate, not shown. The front end 7 of the connecting member 3 is inserted into a slot 8 provided in the cup-shaped insert 1 and extending parallel to the center axis of the cup-shaped insert 1. The front end 7 of the connecting member 3 is provided with a rectangular recess 9, as shown in FIG. 2. A lug 10 is bent vertically upwardly at the rearward end of the recess 9. The lug 10 serves as a stop for the plate to be screwed on, on the one hand, and for the cup-shaped insert 1, on the other hand. An indentation 11 is provided in the cup-shaped insert 1 for the lug 10, so that the lug 10 extends flush with the front surface 12 of the cup-shaped insert 1.

The tightening screw 2 is mounted in a square nut 14 and extends at an angle of 45 degrees relative to the direction of insertion 13 of the connecting member 3 in the cup-shaped insert 1. The square nut 14 is mounted in a longitudinal slot 15 of the cup-shaped insert 1 and is non-rotatable, but slightly longitudinally displaceable, so that there is a certain play for the tightening screw 2. The front end 16 of the tightening screw 2 is a plane surface. The forward inner edge 17 of the recess 9 is inclined in such a way that it extends parallel to the front surface of the end 16 of the tightening screw 2. This results in a surface contact of the components relative to each other, so that the application of higher forces becomes possible.

Before the plates, not shown, are assembled, the cup-shaped insert 1 is forced into a bore of one plate and the other plate is screwed to the connecting member 3. Before the connecting member 3 is inserted in the cup-shaped insert 1, the tightening screw 2 has been screwed in to such an extent that it is located slightly below the surface 18 of the connecting member 3. The connecting member 3 has at its forward edge an inclined abutting surface 19. When the connecting member 3 is inserted into the cup-shaped insert 1, the tightening screw 2 is raised by the inclined abutting surface 19 as a result of the slight play of the tightening screw 2 until the front end 16 of the tightening screw 2 is located behind and locks with the forward inner edge 17. As a result, a preliminary connection of the parts is produced. Subsequently, the tightening screw 2 is screwed in further, so that the connecting member 3 is moved and pressed in the direction of insertion 13 and a fixed, non-releasable connection of the plates is produced.

The invention is not limited by the embodiments described above which are presented as examples only but can be modified in various ways within the scope of protection defined by the appended patent claims.

I claim:

1. A fitting for connecting structural components, the fitting comprising a cup-shaped insert connectable to a first structural component and a connecting member connectable to a second structural component, the cup-shaped insert having a slot for receiving the connecting member, the connecting member being insertable in the slot in a direction of insertion, a nut being arranged in the cup-shaped insert, a tightening screw being mounted in the nut the tightening screw having a front end being rotatably mounted in the cup-shaped insert and extending obliquely relative to the direction of insertion, the connecting member having a recess with a front inner edge, the front end of the tightening screw contacting the front inner edge of the recess when the tightening screw is screwed into the cup-shaped insert, means for providing a slight play for the nut, the connecting member having a front edge, the front edge defining an inclined abutting surface for engaging the tightening screw during assembly.

2. The fitting according to claim 1, wherein the front end of the tightening screw is a plane surface, and wherein the front inner edge of the recess of the connecting member is inclined and extends approximately parallel to the plane surface of the front end of the tightening screw.

3. The fitting according to claim 1, wherein the nut is a square nut, the cup-shaped insert defining a longitudinal slot, the square nut being mounted in the longitudinal slot so as to be non-rotatable and slidable in a direction perpendicular to the longitudinal axis of the tightening screw.

4. The fitting according to claim 3, wherein the square nut is mounted with a slight play in the longitudinal slot for providing the means for the slight play of the tightening screw.

5. The fitting according to claim 1, wherein the connecting member comprises a stop member, and wherein the cup-shaped insert has a recess for receiving the stop member.

6. The fitting according to claim 5, wherein the stop member is a lug extending perpendicularly from the plane of the connecting member.

7. The fitting according to claim 1, wherein the cup-shaped insert defines a bore for receiving the tightening screw, the bore of the cup-shaped insert having a reduced diameter portion at the nut for obtaining a self-locking mounting of the tightening screw.

* * * * *